Patented Apr. 5, 1927.

1,623,942

UNITED STATES PATENT OFFICE.

ABRAHAM HENWOOD, OF CYNWYD, PENNSYLVANIA, ASSIGNOR, BY MESNE ASSIGNMENTS, TO RAYMOND M. GAREY, OF WILLOW GROVE, PENNSYLVANIA.

METHOD FOR THE PREPARATION OF HYDROGEN SULPHIDE.

No Drawing. Application filed November 9, 1925. Serial No. 68,016.

This invention relates to an improved method of generating hydrogen sulphide and to a new composition of matter which will evolve hydrogen sulphide, as hereinafter described.

One object of my invention is to provide a new and highly useful method of generating hydrogen sulphide gas. A further object is to provide a method for generating gas by which the flow and amount of gas can be controlled at will.

The use and preparation of a new composition of matter which will evolve hydrogen sulphide gas upon the application of heat furnishes still another object.

Hydrogen sulphide gas is used extensively in chemical work today; no analytical and few research laboratories can be without it. In qualitative analysis, the metallic ions are separated into groups by taking advantage of the difference in solubilities of their sulphides. The gas is a powerful reducing agent, having a great affinity for oxygen. This property is employed when the chromates, manganates, nitrates and the like are reduced to lower stages of oxidation by being brought in contact with the gas.

Hydrogen sulphide is usually prepared by the addition of a dilute acid, sulphuric or hydrochloric, to iron sulphide (ferrous sulphide). For laboratory work, the so-called Kipp generator is usually employed. On a larger scale, the gas may be produced in a hydrogen sulphide generator of the Kipp type and thereafter delivered to the various parts of the building. In either method of generation, the gas will be contaminated by impurities. The most important of which is the acid and metallic salt fog which necessitates scrubbing the gas by passing it through a wash bottle before use. Besides this fog, the gas will contain certain gaseous impurities which cannot be removed by scrubbing, the most important of which are hydrogen and gaseous hydrocarbons. These are evolved by the acid from its reaction on iron and other foreign substances present in the iron sulphide.

From the standpoint of manipulation, the generators of hydrogen sulphide have many disadvantages. They are prone to leakage, the flow of gas is not easily controlled, and the salt residue after evolution is difficult and dangerous to remove, for always a certain quantity of unneutralized acid and the poisonous hydrogen sulphide will remain dissolved in the residue.

I have discovered a ready means of furnishing pure hydrogen sulphide in amounts and for the length of time desired. In my method, no scrubbing of the gas is necessary, neither will there be impurities such as the hydrogen or the hydrocarbons mentioned above. I have invented a material which will upon the application of heat furnish hydrogen sulphide.

I have found that if sulphur and a hydrocarbon having a boiling point of over $110°$ C. are intimately mixed and dispersed throughout an inert material that hydrogen sulphide in a pure form will be evolved upon the application of heat. The hydrocarbon may be paraffine wax or any other material which is chemically composed of carbon and hydrogen. The inert material may be asbestos fiber, flaked mica, silica gel, or any other absorbent material.

The presence of the inert substance causes the material to give off hydrogen sulphide until the active ingredients are exhausted. It also tends to prevent the volatilization of the paraffine and precludes the possibilty of entrainment of the paraffine vapor in the evolved gas. Furthermore, since the reaction gives a residue, carbon, the presence of the inert material will aid in the cleansing of the apparatus after exhaustion, for the residue instead of being a solid mass will be distributed throughout the inert material and therefore easily removed.

I have found it of advantage to bring the three substances into close contact since the more intimately two reacting substances are mixed, the more satisfactory will be the chemical reaction. Grinding the three materials together will furnish one means of making my material. I have also found that if the two reacting materials be dissolved in a common solvent such as carbon bisulphide and the asbestos fiber or other material added to the solution, then upon evaporation of the solvent a very intimate mixture between the sulphur and the paraffine results which will be homogeneously distributed throughout the fibrous material. Another method of dispersing the sulphur and the hydrocarbon on the inert material is to melt the hydrocarbon and to mix with it the sulphur and the inert material. The percentages of the ingredients may vary widely, but I have found that the sulphur and hydrocarbon act to best advantage if in the reacting proportions. If the following proportions are used, a very satisfactory result is obtained: sulphur 36%, paraffine 14%, and asbestos 50%.

The prepared material may be heated in a test tube or in any other convenient container and will evolve the hydrogen sulphide when a temperature somewhat above that at which sulphur is plastic is reached. If desired, the flow may be continued at an undiminished rate until the charge is exhausted. However, if the source of heat is removed, the evolution of gas will cease in about one minute. This means that the contamination of the air in the laboratory will be minimized. From the above, it will be seen that my invention furnishes a means of supplying hydrogen sulphide gas in an amount and for a length of time that is desired. Furthermore, the apparatus after the exhaustion of the charge is easy to clean; the residue will consist simply of inert material coated with carbon black. This is removed easily from the generator which will require no washing or drying before the addition of a further charge.

While I have mentioned specifically paraffine wax and asbestos fiber, my invention covers those materials which in the presence of sulphur will evolve hydrogen sulphide and to inert materials which are equivalent in their action to the asbestos fiber. Considerable modifications in the methods of preparing the material, in the proportions used, and in the methods of using the same are possible with no departure from the essential features of my invention.

I claim:

1. As a new composition of matter, a substance which will evolve hydrogen sulphide upon the application of heat, comprising a hydrocarbon having a boiling point above 110° C., sulphur and asbestos.

2. As a new composition of matter, a substance which will evolve hydrogen sulphide upon the application of heat, comprising paraffine, sulphur and asbestos.

3. As a new composition of matter, a substance which will evolve hydrogen sulphide upon the application of heat comprising a hydrocarbon having a boiling point above 110° C., sulphur and an absorbent material, said composition characterized by intimate contact between the three ingredients obtained by dissolving the hydrocarbon and the sulphur in a solvent, saturating the absorbent material therewith, and thereafter evaporating the solvent.

4. As a new composition of matter, a substance which will evolve hydrogen sulphide upon the application of heat comprising paraffine, sulphur and an absorbent material, said composition characterized by intimate contact between the three ingredients obtained by dissolving the paraffine and the sulphur in a solvent, saturating the absorbent material therewith, and thereafter evaporating the solvent.

5. As a new composition of matter, a substance which will evolve hydrogen sulphide upon the application of heat comprising a hydrocarbon having a boiling point above 110° C., sulphur and asbestos, said composition characterized by intimate contact between the three ingredients obtained by dissolving the hydrocarbon and the sulphur in a solvent, saturating the asbestos therewith, and thereafter evaporating the solvent.

6. As a new composition of matter, a substance which will evolve hydrogen sulphide upon the application of heat comprising paraffine, sulphur and asbestos, said composition characterized by intimate contact between the three ingredients obtained by dissolving the paraffine and the sulphur in a solvent, saturating the asbestos therewith, and thereafter evaporating the solvent.

7. As a new composition of matter, a substance which will evolve hydrogen sulphide upon the application of heat comprising asbestos treated with a fluid mixture of a hydrocarbon having a boiling point above 110° C. and sulphur.

8. As a new composition of matter, a substance which will evolve hydrogen sulphide upon the application of heat comprising asbestos treated with a fluid mixture of paraffine and sulphur.

9. The method of making hydrogen sulphide which comprises heating a hydrocarbon having a boiling point above 110° C. and sulphur in the presence of asbestos fiber.

10. The method of making hydrogen sulphide which comprises heating paraffine and sulphur in the presence of asbestos fiber.

11. The preparation of a material which will evolve hydrogen sulphide upon the application of heat, which comprises bringing into intimate contact asbestos, finely divided sulphur and a hydrocarbon having a boiling point above 110° C.

12. The preparation of a material which will evolve hydrogen sulphide upon the application of heat which comprises treating asbestos with a fluid mixture of a hydrocarbon having a boiling point above 110° C. and sulphur.

13. The preparation of a material which will evolve hydrogen sulphide upon the application of heat which comprises treating asbestos with a fluid mixture of paraffine and sulphur.

14. The method of making a material which will evolve hydrogen sulphide upon the application of heat, which comprises treating an inert absorbent with a solution of sulphur and hydrocarbon having a boiling point above 110° C., and thereafter evaporating the solvent.

15. The method of making a material for evolving hydrogen sulphide upon the application of heat which comprises treating an inert absorbent with a solution of sulphur and paraffine, and thereafter evaporating the solvent.

16. The method of making a material for evolving hydrogen sulphide upon the application of heat which comprises treating asbestos with a solution of sulphur and hydrocarbon having a boiling point above 110° C., and thereafter evaporating the solvent.

17. The method of making a material for evolving hydrogen sulphide upon the application of heat which comprises treating asbestos with a solution of sulphur and paraffine, and thereafter evaporating the solvent.

18. As a new composition of matter, a substance which will evolve hydrogen sulphide upon the application of heat comprising a hydrocarbon having a boiling point above 110° C. and sulphur in reacting percentages and 50% of asbestos fiber.

19. As a new composition of matter, a substance which will evolve hydrogen sulphide upon the application of heat comprising 14% of paraffine, 36% of sulphur and 50% of asbestos fiber.

ABRAHAM HENWOOD.